(12) United States Patent
Zhang et al.

(10) Patent No.: US 9,391,983 B2
(45) Date of Patent: Jul. 12, 2016

(54) METHOD AND SYSTEM FOR ACCESS CONTROL

(71) Applicant: Tencent Technology (Shenzhen) Company Limited, Shenzhen (CN)

(72) Inventors: Bin Zhang, Shenzhen (CN); Keren Li, Shenzhen (CN); Min Li, Shenzhen (CN); Zhuo Tang, Shenzhen (CN); Yiheng Liu, Shenzhen (CN); Cuilong Ma, Shenzhen (CN); Jinhai Liu, Shenzhen (CN); Jiangxun Lin, Shenzhen (CN); Kai Liu, Shenzhen (CN); Yueteng Weng, Shenzhen (CN); An Yang, Shenzhen (CN); Wanxiang Huang, Shenzhen (CN); Wenrui Zhang, Shenzhen (CN); Yi Dan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 109 days.

(21) Appl. No.: 14/258,595

(22) Filed: Apr. 22, 2014

(65) Prior Publication Data

US 2014/0325619 A1    Oct. 30, 2014

Related U.S. Application Data

(63) Continuation of application No. PCT/CN2013/090552, filed on Dec. 26, 2013.

(30) Foreign Application Priority Data

Apr. 27, 2013    (CN) .......................... 2013 1 0152754

(51) Int. Cl.
*H04L 29/06* (2006.01)
*H04W 4/00* (2009.01)

(52) U.S. Cl.
CPC ........... *H04L 63/0853* (2013.01); *H04W 4/008* (2013.01)

(58) Field of Classification Search
CPC ...................... H04L 63/0853; G06Q 20/3278
USPC ............................................................ 726/5
See application file for complete search history.

(56) References Cited

U.S. PATENT DOCUMENTS 7,725,421 B1    5/2010 Gedalius et al.
8,540,149 B1 *  9/2013 Chu ..................... G07G 1/0045
                                                235/375

(Continued)

FOREIGN PATENT DOCUMENTS

CN    102025655 A    4/2011
CN    102685025 A    9/2012

(Continued)

OTHER PUBLICATIONS

Chinese Search Report and Written Opinion dated Oct. 23, 2015.
ISR and Written Opinion corresponding to International Application No. PCT/CN2013/090552 dated Apr. 3, 2014, (8p).

*Primary Examiner* — Jason K Gee
(74) *Attorney, Agent, or Firm* — Brinks Gilson & Lione (57) ABSTRACT

In a method for control accessing to a communication account, a second terminal obtains the identification information of a first terminal, and sends the communication account information and identification information of the first terminal to the communication platform; the communication platform sends the communication account information to the first terminal based on the identification information. The first terminal sends the communication account information to a near-field communication (NFC) device and reads the communication account information stored in the NFC device when the distance between them is within the preset range. The first terminal then sends its identification information and the communication account information read from the NFC device to the communication platform. Based on communication account information and identification information, the communication platform controls the first terminal to log in by the use of communication account information.

9 Claims, 8 Drawing Sheets

(56) References Cited

U.S. PATENT DOCUMENTS

2009/0193500 A1* 7/2009 Griffin .................. G06Q 20/10
726/2

2010/0043061 A1* 2/2010 Martin ............... G06Q 30/0603
726/4

2013/0198521 A1* 8/2013 Wu ..................... G06F 21/6209
713/175

FOREIGN PATENT DOCUMENTS

| CN | 102769628 A | 11/2012 |
| CN | 102868696 A | 1/2013 |
| CN | 102882944 A | 1/2013 |

* cited by examiner

METHOD AND SYSTEM FOR ACCESS CONTROL

CROSS REFERENCE TO RELATED APPLICATIONS

The present application is a continuation of PCT Application No. PCT/CN2013/090552, filed on Dec. 26, 2013, which claims priority to Chinese Patent Application No. 201310152754.4, filed on Apr. 27, 2013, and which are incorporated by reference in their entireties.

FIELD

The present disclosure relates to the field of communications, in particular to controlling access to a communication platform.

BACKGROUND

The rapid expansion of internet technology has enabled people to use the network as the primary mode of communication. It is common for people to have one or more email accounts, social networking service accounts etc. An account requires users to authenticate their identity. Separately, it is common for people to access their accounts using more than one communication device.

SUMMARY OF THE INVENTION

Disclosed in the embodiments of the present disclosure are a method and device for acquiring of unread messages, which can display the unread messages rapidly.

Provided in the embodiments of the present disclosure is a method for acquiring of unread messages, comprising receiving a command for acquiring unread messages; Determining the priority values of the unread messages; Determining a threshold value configured to position acquirable unread messages; Comparing the priority values with the threshold value; and Acquiring the unread message if the priority value of the unread message is larger than the threshold value.

Provided in the embodiments of the present disclosure is a device for acquiring of unread messages, comprising: a receiving unit, a first determining unit, a second determining unit, a comparing unit and an acquiring unit, wherein: The receiving unit is configured to receive a command for acquiring unread messages; The first determining unit is configured to determine the priority values of the unread messages; The second determining unit is configured to determine a threshold value configured to position acquirable unread messages; The comparing unit is configured to compare the priority values with the threshold value; and The acquiring unit is configured to acquire the unread message if the priority value of the unread message is larger than the threshold value.

In the aforementioned technical solution, a command for acquiring unread messages is received; the priority values of the unread messages are determined; a threshold value configured to position acquirable unread messages is determined; the priority values are compared with the threshold value; and the unread message is acquired if the priority value of the unread message is larger than the threshold value, in this way, the unread messages can be rapidly acquired only by reception of the command for acquiring unread messages.

DETAILED DESCRIPTION

In embodiments herein, a user may log into a communication account of the user using a terminal. The terminal may include, personal computer (PC), tablet PC, mobile phone, smart-phone, laptop and other devices. The communication account may be instant message (IM) account, phone number, an email account, a social networking account, a micro blogging account, etc. The communication account may be configured to identify the user. The user may be identified or authenticated user based on credentials or identification information provided by the user, for example user name and password. The terminal may be identifiable by information including the internet protocol (IP) address information or media access control (MAC) address.

In embodiments described herein, communication platform can include micro blogging platform, social networking platform, instant message platform and simple notification service (SNS) communication platform which can specifically be a server, etc. The above discussed communication accounts may be located at the communication platform.

Figure 1:
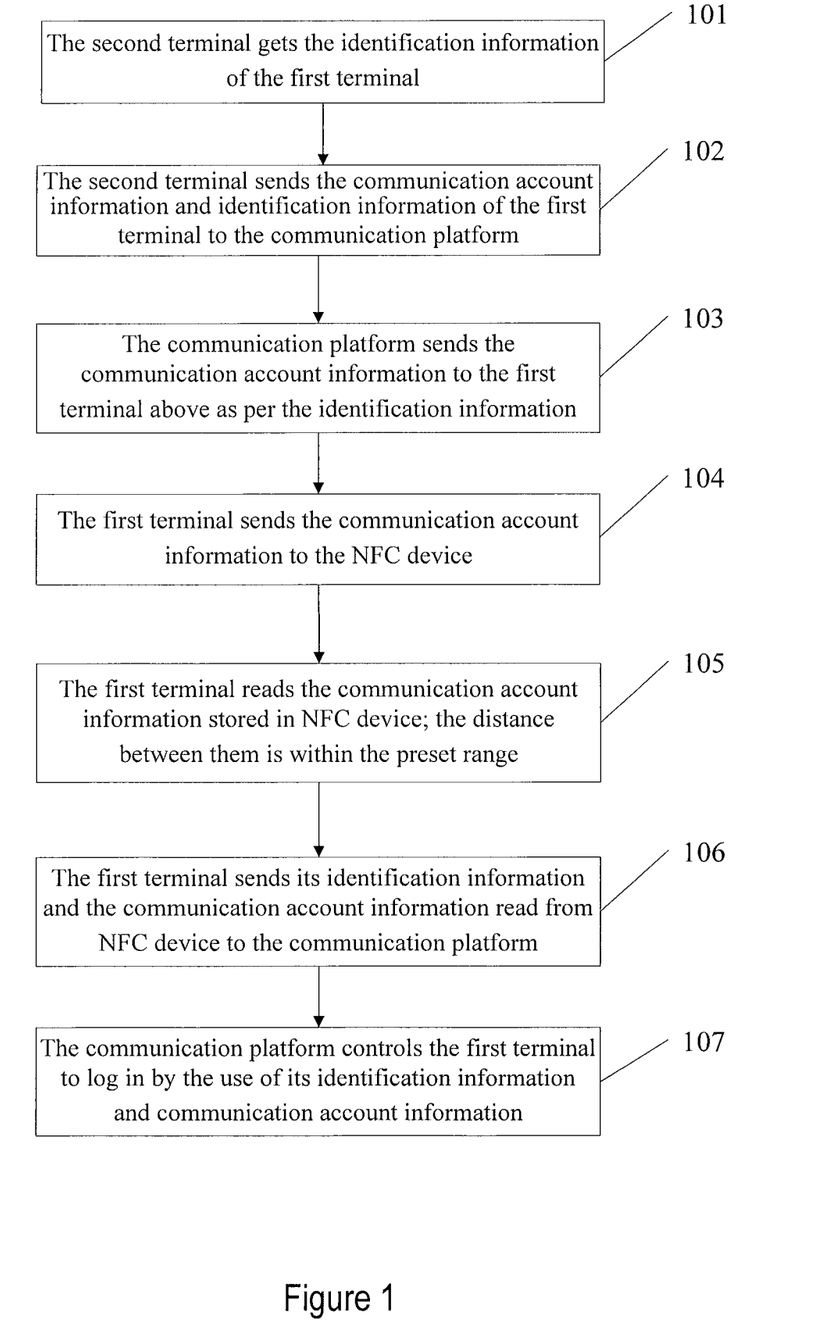
FIG. 1 is the flow diagram of example method for controlling the access to a communication account.

FIG. 1 is the flow diagram of an example method for controlling the access to the communication account of the user. At block 101, a second terminal, which is bound to the communication account information above beforehand, obtains the identification information of the first terminal.

The second terminal being bound to the communication account information beforehand means that the second terminal has stored the communication account information beforehand, in an embodiment. In another embodiment, the user is logged into the user's communication account at the communication platform by the use of the second terminal. In still another embodiment, the second terminal being bound to the communication account information means that a communication channel is established between the second terminal and the communication platform by utilizing the communication account information. An example is the case where a user logs into the user's social networking account located on a communication platform. The user may log in via the second terminal and provide login credentials to the communication platform via the second terminal. On being authenticated, the communication platform establishes a communication channel between the communication platform and the second terminal.

At block 102, the communication platform receives from the second the communication account information and identification information of the first terminal to the communication platform. After receiving the communication account information and identification information of the first terminal, the communication platform can bind this communication account to the first terminal, and send the communication account information to the first terminal in the subsequent process.

At block 103, the communication platform sends the communication account information to the first terminal based on the identification information of the first terminal. The communication platform needs to find the first terminal by the use of its identification information, and sends the communication account information to the first terminal.

At block 104, the first terminal sends the communication account information to a near field communication (NFC) device. Examples of NFC devices include devices that operate in accordance with the RFID protocol, Bluetooth protocol or any other short range protocol. The communication account information may be written to the NFC device. The subsequent steps will be carried out when the user needs to control the first terminal to log in the communication platform by the use of the communication account information, which means that Steps 101~104 can be done beforehand. The first terminal may not save the communication account information which can be obtained again by the first terminal after reading the account information stored by the NFC device.

At block 105, the first terminal may read the communication account information stored in the NFC device when the NFC device is within a determined distance from the first terminal.

The first terminal may read the communication account information stored in the NFC device, and the distance between them is within the preset range, which indicates the first terminal can read the communication account information stored in the NFC device only when their distance is within the preset range.

The first terminal may read the communication account information stored by the NFC device using the appropriate NFC technology. The NFC device may be an NFC card win which case the first terminal may read the communication account information stored in the NFC card through pre-installed NFC card reader.

At block 106, the first terminal sends its identification information and the communication account information read from the NFC device to the communication platform. The first terminal may send the communication account information read from the NFC device and identification information of the first terminal through wireless or wired network to the communication platform. After receiving the above information, the communication platform may identify the first terminal according to this identification information since it is the unique information to identify the terminal, so that it can control the first terminal to log in the communication platform by the use of the said communication account information subsequently.

At block 107, the communication platform controls the first terminal to log in by the use of the communication account information according to the communication account information and identification information above.

The steps for the communication platform to control the first terminal to log in by the use of the communication account information may be carried out as below. The communication platform authenticates the communication account information, and compares the identification information with that sent by the second terminal, if passed, it will control the first terminal to log in the communication platform by the use of the communication account information. E.g. after being authenticated by the communication platform, it will send the interface of this communication account information login to the first terminal for displaying, and interaction of information can be achieved between the first terminal and the communication platform through the above interface. In this step, the communication platform can control the first terminal to log in the communication platform by the use of the communication account information in form of webpage according to the communication account information and identification information above, such as displaying the login interface in the webpage.

In the scenario describe above the first terminal reads the communication account information stored in the NFC device. When the distance between them is within the preset range; the first terminal sends its identification information and the communication account information read from the NFC device to the communication platform; the communication platform controls the first terminal to log in by the use of the communication account information according to the communication account information and identification information. Thus, the first terminal is capable of automatically logging in the said communication platform by the use of the communication account information just by reading the communication account information stored in the NFC device, which simplifies the login process of communication account information.

Figure 2:
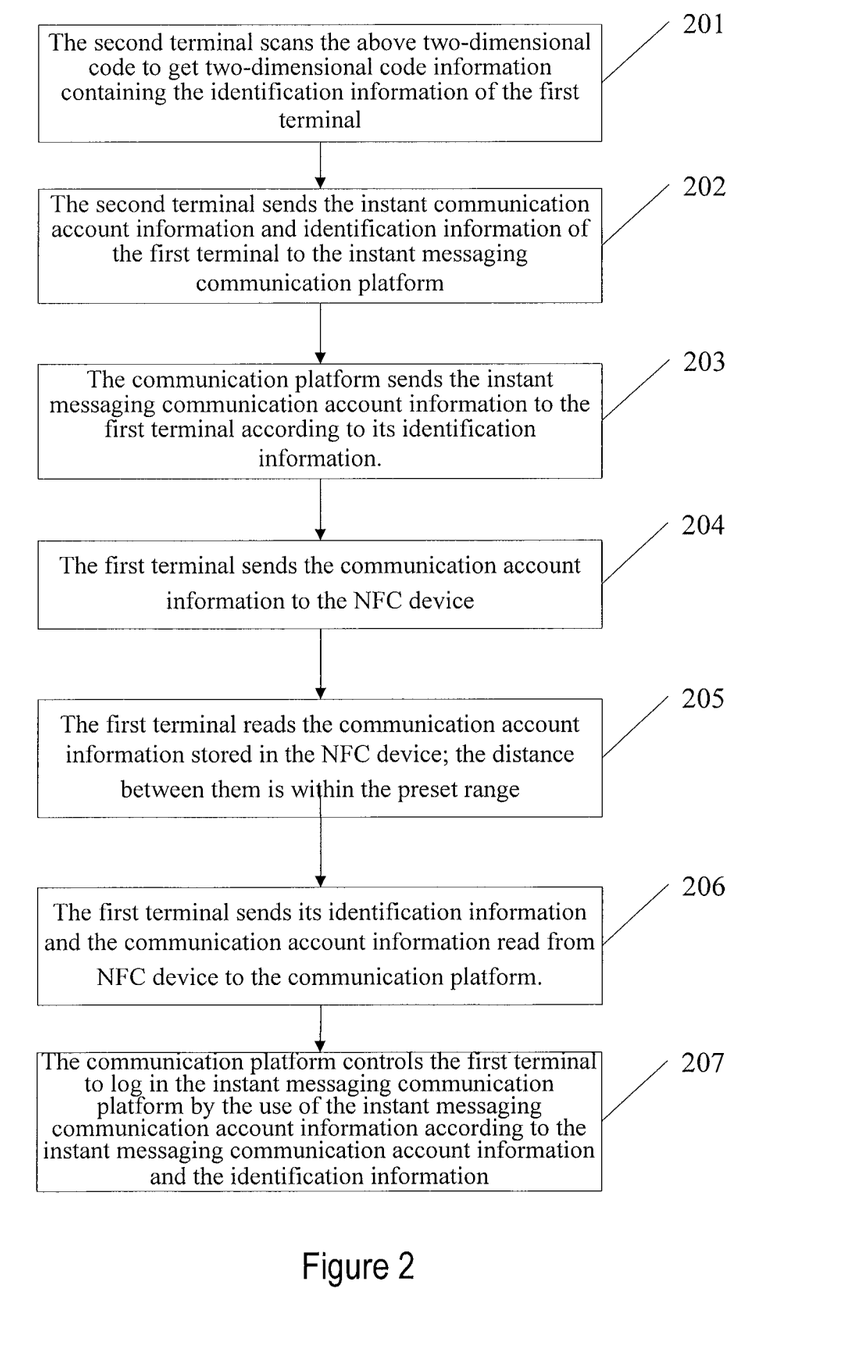
FIG. 2 is the flow diagram of another example method for controlling the access to a communication account.

FIG. 2 is the flow diagram of another flow diagram of example method for controlling the access of a user to the communication account of the user. At block 201, the second terminal, which is bound to the communication account information beforehand, scans the two-dimensional code shown by the first terminal to obtain the two-dimensional code information containing the identification information of the first terminal. The two-dimensional (2-D) code may correspond to a universal product code (UPC) bar code, a quick response (QR) code etc. The 2-D code may be displayed at a display of the first terminal or may be affixed to the enclosure of the first terminal.

As previously discussed, the second terminal is the one bound to the communication account information beforehand, which means that it has stored this communication account information beforehand, or it is the current terminal logged in the communication platform by the user of this communication account.

At block 202, the second terminal sends the communication account information and identification information of the first terminal to the communication platform. After receiving the communication account information and identification information of the first terminal, the communication platform can bind this communication account to the first terminal, and send the communication account information to the first terminal in the subsequent processes.

At block 203, the communication platform sends the communication account information to the first terminal based on the first terminals identification information. The communication platform finds the first terminal by the use of its identification information, and sends the communication account information to the first terminal. For example the communication platform may perform a DNS lookup when the identification information received from the second terminal is the web address of the first terminal.

At block 204, the first terminal sends the communication account information to an NFC device.

It is important to note that the communication account information may be written to the NFC device beforehand, the subsequent step will be carried out only after the user requires controlling the first terminal to log in the communication platform by the use of the communication account information. Meanwhile, after carrying out this step, the first terminal may not save the communication account information, and will obtain the communication account information again after reading the account information stored by the NFC device.

At block 205, the first terminal reads the communication account information stored in the NFC device; the distance between them is within the preset range. The first terminal reads the communication account information stored in the NFC device, when the distance between them is within the preset range, which indicates the first terminal can read the communication account information stored in the NFC device only when their distance is within the preset range thus ensuring the safety of communication account information.

At block 206, the first terminal sends its identification information and the communication account information read from NFC device to the communication platform. The first terminal can send the communication account information read from the NFC device and identification information of the first terminal through wireless or wired network to the communication platform. After receiving the above information, the communication platform can identify the first terminal according to this identification information since it is the unique information to identify the terminal, so that it can control the first terminal to log in the communication platform by the use of the said communication account information subsequently.

At block 207, the communication platform controls the first terminal to log in by the use of the communication account information according to the communication account information and identification information above.

The step for communication platform to control the first terminal to log in by the use of the communication account information can be carried out as below: the communication platform authenticates the communication account information, and compares the identification information with that sent by the second terminal, if passed, it will control the first terminal to log in the communication platform by the use of the communication account information above. E.g. after being authenticated by the communication platform, it will send the interface of this communication account information login to the first terminal for displaying, interaction of information can be achieved between the first terminal and the communication platform through the above interface.

In the technical scheme above, multiple embodiment modes can be achieved based on the above embodiments, which simplifies the login process of communication account information.

Figure 3:
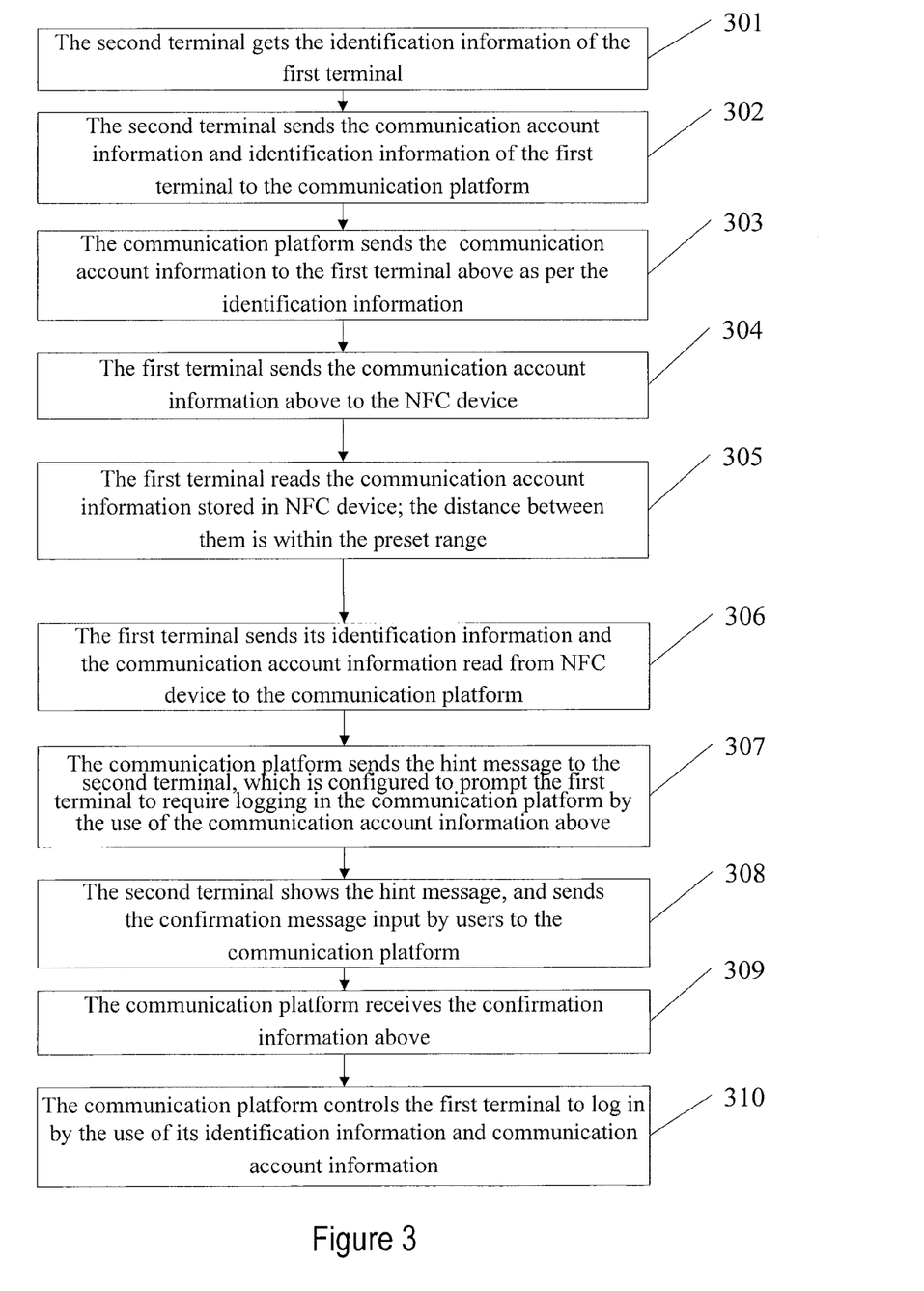
FIG. 3 is the flow diagram of yet another example method for controlling the access to a communication account.

FIG. 3 is a flow diagram of another example method for controlling the access of a user to the communication account of the user. At block 301, the second terminal, which is bound to the communication account information beforehand, obtains the identification information of the first terminal. At block 302, the second terminal sends the communication account information and the identification information of the first terminal to the communication platform. At block 303, the communication platform sends the communication account information to the first terminal based on the above identification information. At block 304, the first terminal sends the communication account information to the NFC device. At block 305, the first terminal reads the communication account information stored in the NFC device; the distance between them is within the preset range.

At block 306, the first terminal sends its identification information and the communication account information read from the NFC device to the communication platform.

At block 307, the communication platform sends a hint message to the second terminal, which is configured to prompt the first terminal to request logging in the communication platform by the use of the communication account information above. At block 307, only if the first terminal logs in by the use of the said communication account information, can the communication platform send the hint message to the second terminal. E.g. the communication platform records the login information when the first terminal logs in by the use of the communication account information, relying on which it can judge if it is the first time for the first terminal to log in the above communication platform by the use of the communication account information and if it is, the platform will send the said hint message to the second terminal.

The hint message may be a CAPTCHA type challenge response test, in an embodiment. In this embodiment, the communication platform allows the first terminal to login with the communication account information in response to receiving from the second terminal a correct response to the CAPTCHA test. In another embodiment, the hint message may include prompting the user to enter a password at the second terminal.

In the embodiment of present disclosure, if the communication platform determines that it is not the first time for the first terminal to log into the above platform by the use of the communication account information, it can directly carry out Step 306 rather than sending hint message to the second terminal.

At block 308, the second terminal displays the hint message and sends the confirmation message input by user to the communication platform. The confirmation message is configured to allow the first terminal to log in the communication platform by the use of the communication account information.

The second terminal receives the hint message sent by communication platform. The user can input confirmation message and the second terminal may send this confirmation message again to the communication platform. For example, the second terminal logs in communication platform by the use of this communication account in advance, and displays the interface for logging in the communication platform. In an embodiment, when communication platform sends the hint message to the second terminal, the login interface displays this message on whose interface the virtual button is shown, and if the user needs to input confirmation message, the user may click button displayed at the second terminal of this button to generate the message which shall be sent to communication platform later.

At block 309, the communication platform receives the confirmation message. When communication platform receives the confirmation message, it may indicate that the second terminal allows the first terminal to log in communication platform by the use of communication account information, thus making it possible for the communication platform to control the first terminal to log in by the use of communication account information only with the second terminal authorization.

At block 310, the communication platform controls the first terminal to log in the communication platform by the use of communication account information according to the communication information and identification information.

Figure 4:
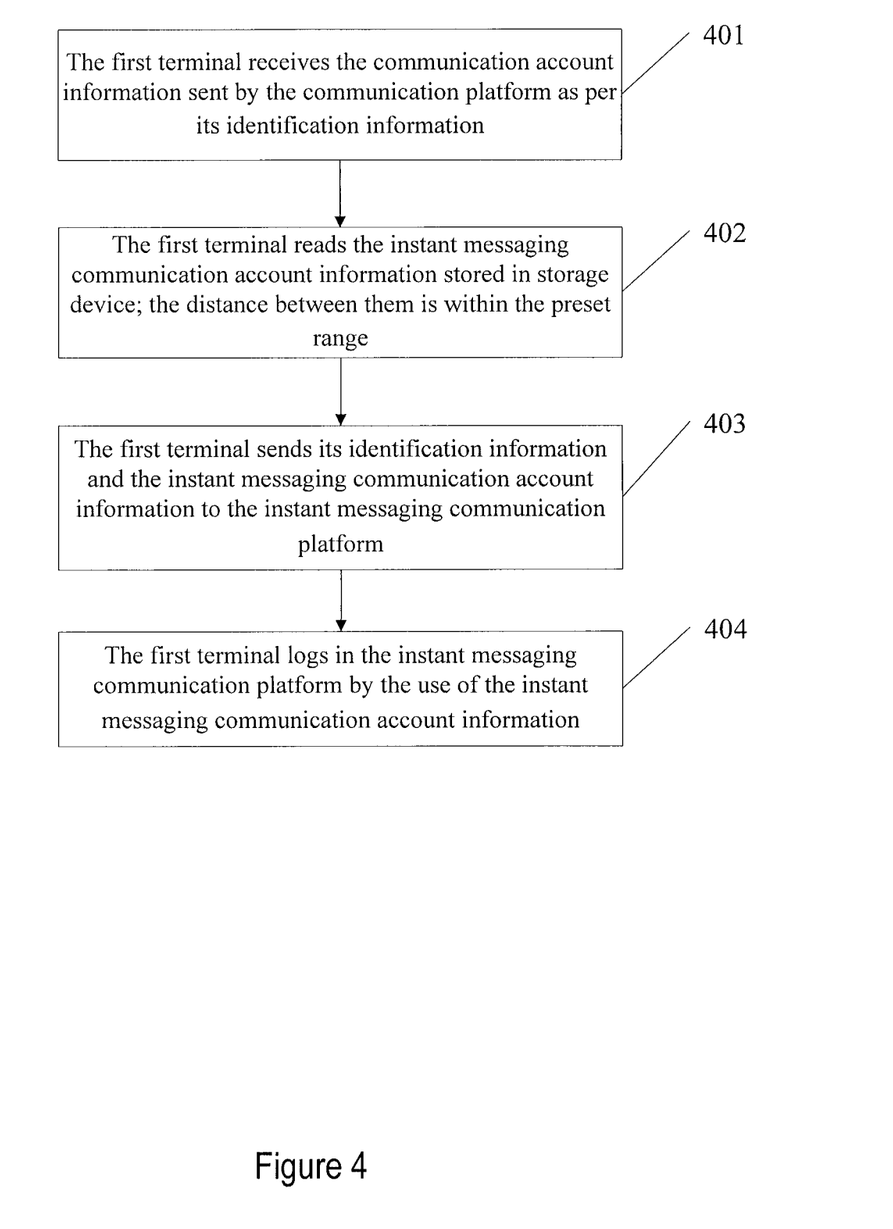
FIG. 4 is the flow diagram of still another example method for controlling the access to a communication account.

FIG. 4 is a flow diagram of another example method for controlling the access of a user to the communication account of the user. At block 401, the first terminal receives the communication account information sent by communication platform based on the identification information of first terminal identification information. As previously discussed, the identification information of first terminal may be received by a second terminal bound via an already established communication channel between the communication platform and the second terminal.

The second terminal, which is bound to the communication account information beforehand, gets the identification information of the first terminal in advance and sends the communication account information and identification information of the first terminal to the communication platform, which shall send the communication account information to the first terminal according to its identification information.

At block 402, the first terminal sends the communication account information to an NFC device.

In an embodiment, the NFC device can only store one piece of communication account information, which means that one NFC device is bound to only one piece of communication account information. This step can establish communication connection between the first terminal and NFC device, and judge if the NFC device stores communication account information, and if not, it will send the—communication account information to the NFC device. Additionally, Step 401 and 402 may have been performed in advance, in an embodiment. In this embodiment, block 403 will be directly performed when a user requires the second terminal to log in communication platform by the use of communication account information.

At block 403, the first terminal may read the communication account information stored in NFC device when the NFC device is within a preset distance from the first terminal.

The first terminal reads the communication account information stored in NFC device with the distance between them within the preset range, indicating that the first terminal can read the communication account information stored in NFC device only if their distance is within the preset range, thus ensuring the safety of communication account information. E.g. a user can only use the first terminal but have no access to NFC device, meaning that the user fails to make the distance between them within the preset range, thus the first terminal cannot log in communication platform by the use of this communication account.

The first terminal may read the communication account information stored by NFC device through NFC technology, e.g. reading the communication account information stored by NFC device through NFC technology, i.e. this NFC device may be NFC card, and the first terminal can read the communication account information stored in NFC card through pre-installed NFC card reader.

At block 404, the first terminal sends its identification information and the communication account information read from NFC device to the communication platform.

The first terminal may send the communication account information read from the NFC device and identification information of the first terminal through wireless or wired network to the communication platform. After receiving the information, the communication platform may identify the first terminal according to this identification information and allow the user to log into the communication platform via the first terminal by the use of the communication account information.

At block 405, the first terminal logs in the communication platform by the use of the communication account information. In this step, the communication platform is capable of controlling the first terminal to log in by the use of the communication account information and validate the information. If it is validated, the first terminal can log in the instant communication platform by the use of this communication account information. For example, after the communication account information is validated, the communication platform will send its login interface to the first terminal for displaying, through which the first terminal can exchange information with the communication platform. In this step, the communication platform is capable of controlling the first terminal to log in by the use of communication account information in form of webpage, based on the communication account information and identification information. For example, display a login interface in the webpage.

In the above scenario, the first terminal reads the communication account information stored in NFC device; the distance between them is within the preset range; the first terminal sends its identification information and the communication account information read from NFC device to the communication platform; the first terminal logs in the communication platform by the use of the communication account information. Thus, the first terminal is capable of automatically logging in the communication platform by the use of the communication account information just by reading the communication account information stored in NFC device, which simplifies the login process of communication account information.

Figure 5:
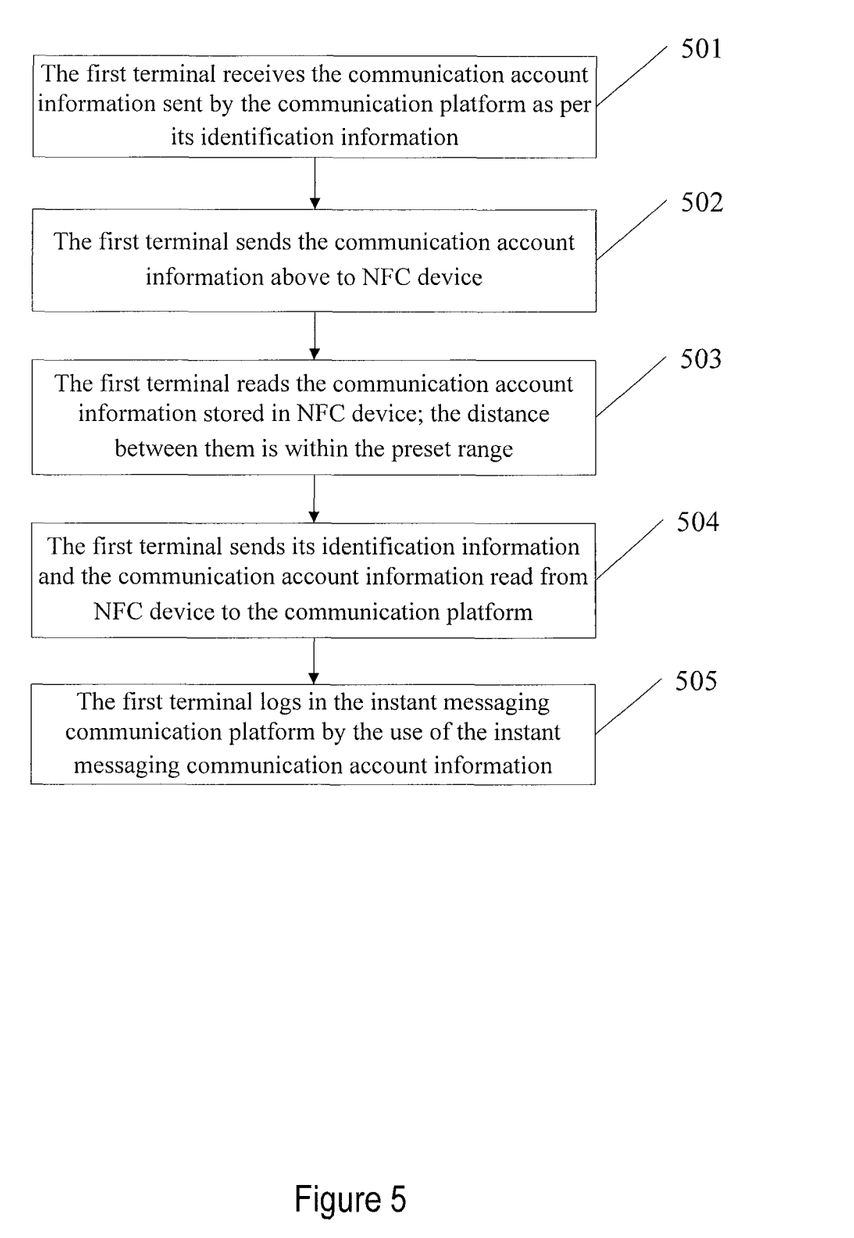
FIG. 5 is the flow diagram of one more example method for controlling the access to a communication account.

FIG. 5 is a flow diagram of yet another example method for controlling the access of a user to the communication account of the user. At block 501, a first terminal receives the communication account information sent by the communication platform according to its identification information, which is got by the second terminal through scanning the two-dimensional code shown by the first terminal, and sent to the communication platform by the second terminal, which is bound to the communication account information in advance, by which the communication account information is send to the communication platform.

The first terminal displays two-dimensional code containing its identification information in advance, and then the second terminal, which is bound to the communication account information in advance, scans the above two-dimensional code showed by the first terminal to get two-dimensional code information containing the identification information of the first terminal; the second terminal sends the communication account information and identification information of the first terminal to the communication platform, through which the communication account information is sent to the first terminal according to its identification information.

At block 502, the first terminal sends the communication account information to the NFC device. The NFC device may be able to store only one communication account information, which means that one NFC device is bound to only communication account. This step can establish communication connection between the first terminal and NFC device, and determine if the NFC device stores communication account information, and if not, it will send the communication account information to the NFC device.

At block 503, the first terminal reads the communication account information stored in NFC device when the distance between the first terminal and NFC device is within the preset range.

At block 504, the first terminal sends its identification information and the communication account information read from NFC device to the communication platform. After receiving the communication account information and identification information of the first terminal, the Apparatus described herein and methods implemented therein retrieve unread email messages received at a receiving communication account based on a priority value associated with each of the unread messages.

Communication platform can control the first terminal to log in by the use of the communication account information, and specifically, it may send login interface of communication account information to the first terminal. The first terminal logs in the communication platform by the use of the communication account information. This step may be described as the first terminal logs in the communication platform by the use of the communication account in form of webpage version.

It can also be described as after receiving the confirmation message sent by the second terminal, communication platform controls the first terminal to log in by the use of the communication account information, and the confirmation message is configured to allow the first terminal to log in the communication platform by the use of the communication account information.

This embodiment can refer to that the first terminal logs in the communication platform by the use of the communication account information for the first time. If not (e.g. the second time, third time, etc.), rather than proceeding the above step according to the confirmation message, the communication platform can directly control the first terminal to log in by the use of the communication account information after receiving its identification information and the communication account information sent by it.

The first terminal can log in communication platform by the use of communication account information after installing specified software. The above—between the NFC device and the first terminal is within the preset range, the software will control the first terminal to read communication account information stored in NFC device, send its identification information and the communication account information to server, and log in the communication platform by the use of the account information, all the operations above are completed automatically. In this embodiment mode, the users can realize the login process of the first terminal under the premise that distance between NFC device and the first terminal is within the preset range.

In the technical scheme, multiple embodiment modes can be achieved based on the embodiments, which simplifies the login process of communication account information.

Figure 6:
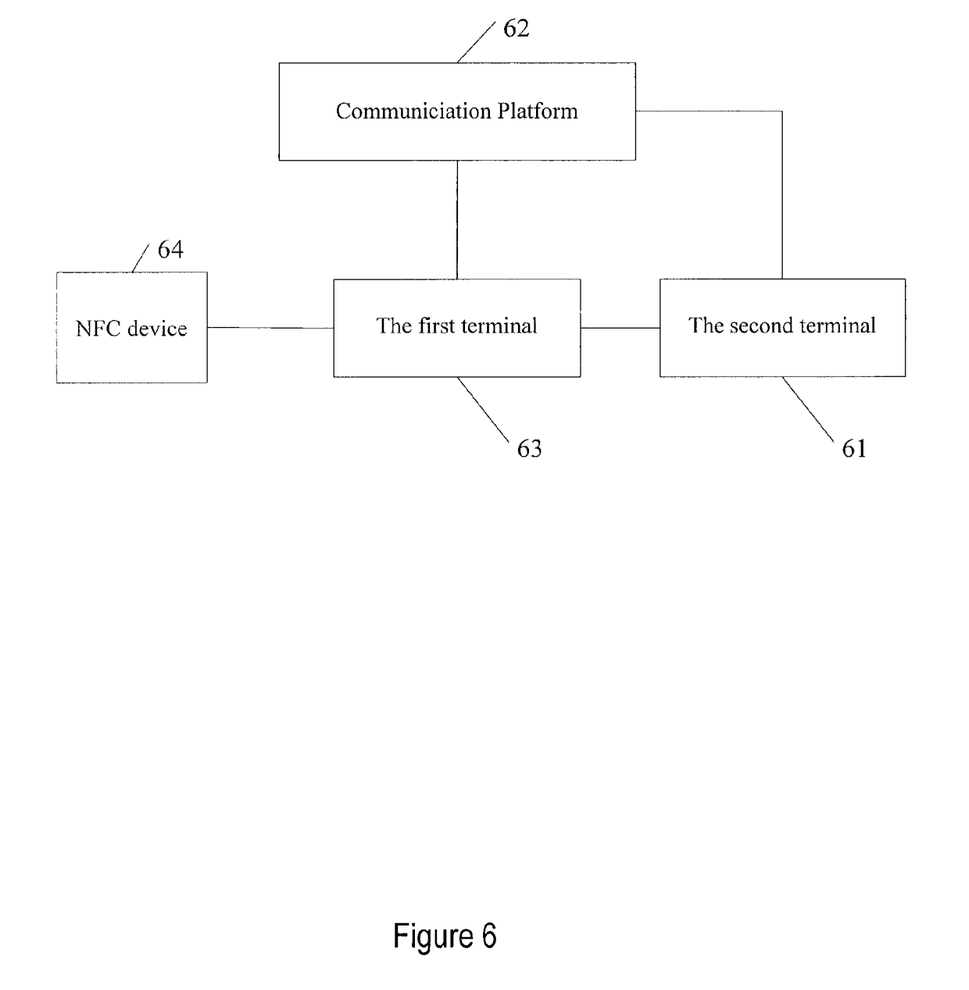
FIG. 6 is a block diagram of an example communication account login system.

FIG. 6 is a block diagram of an example communication account login system 60. In this embodiment the system includes a second terminal 61, communication platform 62, a first terminal 63 and NFC device 64.

As previously discussed, the second terminal 61, which is bound to the communication account information in advance, is configured to get the identification information of the first terminal 63, and send the identification information and communication account information to communication platform 62.

"The second terminal 61 is the one bound to the communication account information in advance" may mean that the second terminal 61 saves the terminal of this communication account information beforehand, or the current terminal logging in the communication platform by the use of the communication account information. E.g. mobile phone logs in communication platform by the use of communication account information. The second terminal can get the identification information of the first terminal through wired or wireless network.

After receiving the communication account information and identification information of the first terminal 63, the communication platform can bind the above account to the terminal, and send the communication account information to the first terminal 63 in the subsequent process.

Communication platform 62 is configured to send the communication account to the first terminal 63 as per its identification information.

Communication platform 62 may find the first terminal 63 by the use of its identification information, and then send the communication account information to the terminal.

The first terminal 63 is configured to send the communication account information to NFC device 64. The communication account information can be written into NFC device beforehand. The first terminal 63 can read the communication account information stored in NFC device 61 when the users shall control the terminal to log in communication platform by the use of the information.

NFC device 64 is configured to store communication account information; the distance between the first terminal 63 and the NFC device 64 is within the preset range;

The first terminal 63 is also configured to read the communication account information stored in NFC device 61 and send the information and its identification information to communication platform 62.

The first terminal 63 reads the communication account information stored in NFC device 64, the distance between them is within the preset range, which indicates that the first terminal 63 can read the communication account information stored in NFC device 64 only when their distance is within the preset range thus ensuring the safety of communication account information. E.g. a user can only use the first terminal 63 but have no access to NFC device 64, meaning that he fails to make the distance between them within the preset range. Therefore, the first terminal 63 cannot log in communication platform 64 by the use of this communication account.

The first terminal 62 may read the communication account information stored by NFC device 64 through NFC technology, e.g. reading the communication account information stored by NFC device 64 through NFC technology, which means this NFC device 64 can be NFC card, and the first terminal 63 can read the communication account information stored in NFC card through pre-installed NFC card reader.

The first terminal 63 may send the communication account information read from the NFC device and its identification information through wireless or wired network to the communication platform 62. After receiving the information, the communication platform may identify the first terminal 63 according to this identification information since it's the unique information to identify the terminal, to make it convenient for the subsequent control to the first terminal 63 to log in the communication platform 62 by the use of the communication account information.

The communication platform 62 may be configured to control the first terminal 63 to log in by use of communication account information according to the communication account information and identification information. The step for communication platform 62 to control the first terminal 63 to log in the platform by use of communication account information may be carried out described in the forthcoming paragraph.

The communication platform 63 validates the communication account information, compares the identity information with that sent by the second terminal, and if passed, it will control the first terminal 63 to log in the communication platform 62 by use of the communication account information. E.g. after being validated by communication platform 62, it will send the interface for this communication account information login to the first terminal 63 for displaying, and interaction of information can be achieved by the first terminal 63 through the interface and communication platform 62. In this step, the communication platform 62 can control the first terminal 63 to log in by use of the communication account information in form of webpage according to the communication account information and its identification information, such as displaying the login interface in the webpage.

In another embodiment, the second terminal 61 may be configured to scan a two-dimensional code displayed by the first terminal 63 to get the two-dimensional code information containing the identification information of the first terminal. In this embodiment, the second terminal 61 may also get the identification information of the first terminal 63 by scanning the two-dimensional code.

In yet another embodiment, the communication platform 62 may also be configured to send a hint message to the second terminal 61, which is used for prompting the first terminal 63 to log in the communication platform 62 by the use of communication account information.

The second terminal 61 can also be configured to show the hint message, and send the confirmation message input by user to the communication platform 62; the confirmation message is configured to allow the first terminal 63 to log in communication platform 62 by the use of the communication account information.

The communication platform 62 can also be configured to control the first terminal 63 to log in by the use of communication account information according to the communication information and identification information.

The communication platform 62 may also be configured to determine if it is the first time that the first terminal 63 is logging in to a user communication account using the communication account information of the user. The communication platform 62 may send the hint message to the second terminal 61 on determining that it is first time.

If the communication platform 62 judges that it's not the first time for the first terminal 63 to log in by the use of the communication account information, it can directly control the first terminal 63 to log in by the use of communication account information according to the communication account information and its identification information, needless to send hint message to the second terminal 61.

In the technical scheme, the first terminal reads the communication account information stored in NFC device; distance between them is within the preset range; the first terminal sends its identification information and the communication account information read from NFC device to communication platform, which controls the first terminal to log in by the use of the communication account information according to the communication account information and its identification information. Thus, the first terminal is capable of automatically logging in the communication platform by the use of the communication account information just by reading the communication account information stored in NFC device, which simplifies the login process of communication account information.

Figure 7:
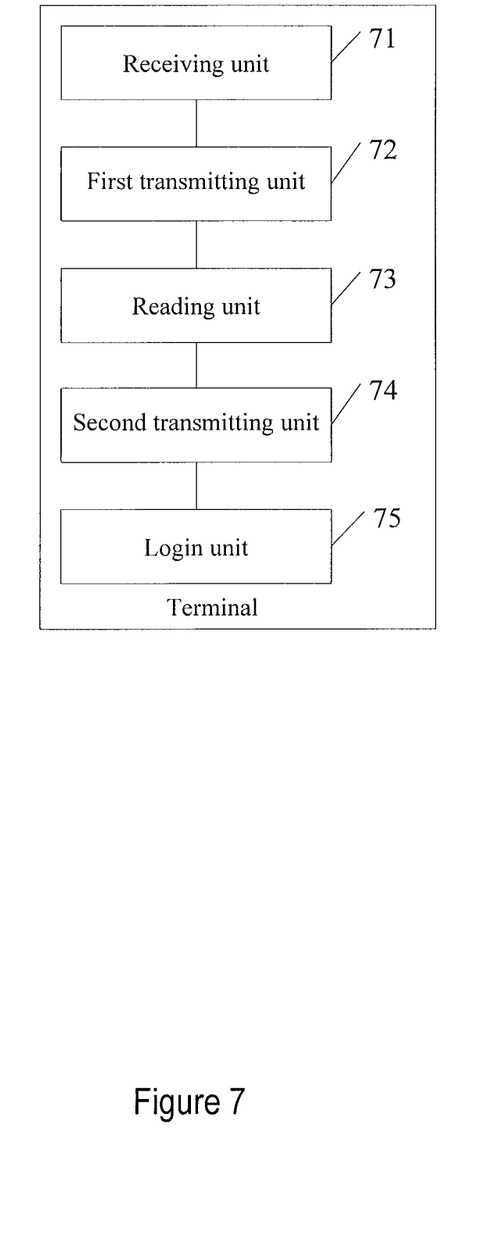
FIG. 7 is the block diagram of an example terminal in accordance with one embodiment.

FIG. 7 is the block diagram of a terminal provided by the embodiment of the invention, and includes a receiving unit 71, a first transmitting unit 72, a reading unit 73, a second transmitting unit 74 and login unit 75.

The receiving unit 71 is configured to receive the communication account information sent by communication platform as per the identification information of the terminal, and the identification information is got by the second terminal bound to the communication account information in advance, and sent to the communication platform by the second terminal. The communication account information is sent to the communication platform by the second terminal.

The second terminal, which is bound to the stated communication account information beforehand, gets identification information of the terminal in advance; it sends the communication account information and identification information of the terminal to the communication platform; which sends the communication account information to the terminal according to the identification information. The first transmitting unit 72 is configured to send communication account information to the NFC device.

The NFC device can only store one piece of communication account information, which means that one NFC device is bound to only one piece of communication account information. This step can establish communication connection between the first terminal and NFC device, and judge if the NFC device stores communication account information, and if not, it will send the communication account information to the NFC device. Additionally, the first transmitting unit 72 sends the communication account information to the NFC device beforehand, and the reading unit will get the information stored in NFC device only when the users requires the second terminal to login communication platform by the use of communication account.

The reading unit 73 is configured to get the communication account information stored in NFC device; the distance between the terminal and NFC device is within the preset range.

The reading unit 73 reads the communication account information stored in NFC device, and the distance between the terminal and NFC device is within the preset range, which indicates that the reading unit 73 can read the communication account information stored in NFC device only when their distance is within the preset range, which ensures the safety of communication account information. E.g. a user can only use the first terminal but have no access to NFC device, meaning that he fails to make the distance between them within the preset range, thus the first terminal cannot log in communication platform by the use of this communication account.

The reading unit 73 can read the communication account information stored by NFC device through NFC technology, e.g. reading the communication account information stored by NFC device through NFC technology, i.e. this NFC device may be NFC card, and the reading unit 73 can read the communication account information stored in NFC card through pre-installed NFC card reader. E.g. the reading unit 73 can read the communication account information stored in NFC device through blue-tooth or infrared technology, meaning that the NFC device possesses the blue-tooth or infrared technology.

The second transmitting unit 74 is configured to send the communication account information read from NFC device and identification information of the first terminal to the communication platform.

The second transmitting unit 74 can send the communication account information read from the NFC device and identification information of the first terminal through wireless or wired network to the communication platform. After receiving the information, the communication platform can identify the first terminal according to this identification information since it's the unique information to identify the terminal, to make it convenient for the subsequent control to the terminal to log in the communication platform by the use of the communication account information.

The login unit 75 is configured to log in the communication platform by the use of the communication account information.

In this step, the communication platform is capable of controlling the login unit 75 to log in by the use of the communication account information and validate the information. If it is validated, the login unit 75 can log in instant communication platform by the use of this communication account information. E.g. after the communication account information is validated, the communication platform will send its login interface to the terminal for displaying by the login unit 75, through which the login unit 75 can exchange information with the communication platform. In this step, the communication platform is capable of controlling the first terminal to log in by the use of the communication account information and in form of webpage, based on the communication account information and identification information. E.g. display login interface in the webpage.

Optional, the terminal can be the first terminal described in the method embodiment, meaning that it can execute any step executed by the first terminal.

In the technical scheme, the terminal reads the communication account information stored in NFC device; distance between the terminal and NFC device is within the preset range; the terminal sends the communication account information read from NFC device and the identification information of the first terminal to communication platform and log in by the use of the communication account information. Thus, the first terminal is capable of automatically logging in the communication platform by the use of the communication account information just by reading the communication account information stored in NFC device, which simplifies the login process of communication account information.

Figure 8:
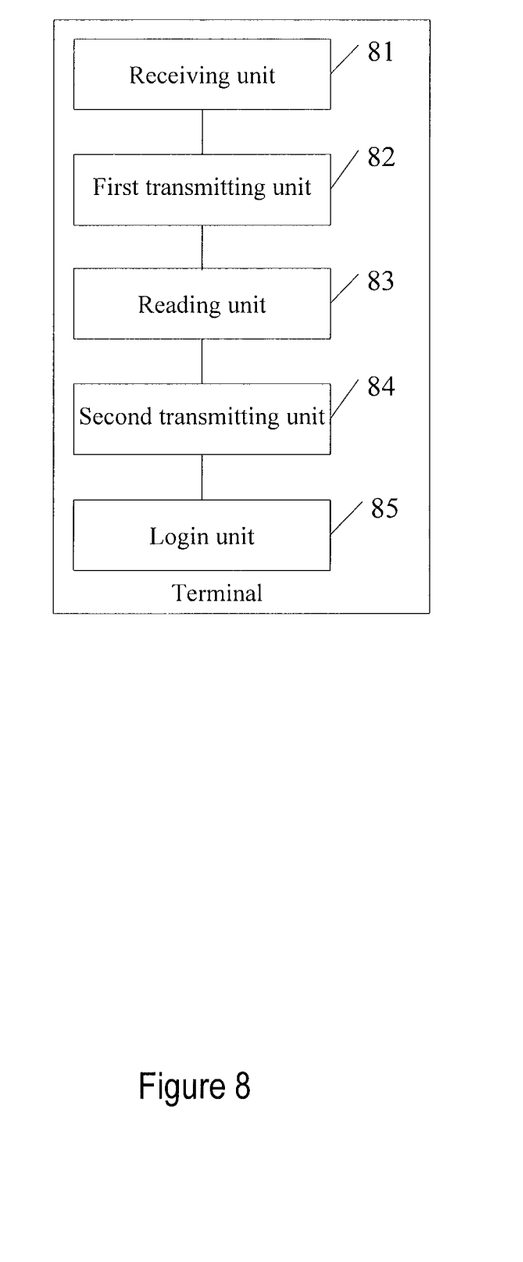
FIG. 8 is the block diagram of example terminal in accordance with another embodiment.

FIG. 8 is a block diagram of a terminal provided by the embodiment of the invention, including: the receiving unit 81, the first transmitting unit 82, reading unit 83, the second transmitting unit 84 and login unit 85, among:

The receiving unit 81 is configured to receive the communication account information sent by communication platform as per the identification information of the first terminal, and the identification information is got by the second terminal bound to the communication account information in advance, by which the information is sent to the communication platform.

The terminal displays two-dimensional code in advance, which contains its identification information, and then the second terminal which is bound to the communication account information in advance, scans the two-dimensional code to get two-dimensional code information containing the identification information of the terminal and sends the communication account information and identification information of the terminal to the communication platform, through which the communication account information is sent to the terminal according to its identification information.

The first transmitting unit 82 sends the communication account information to NFC device.

The NFC device can only store one piece of communication account information, which means that one NFC device is bound to only one piece of communication account information. This step can establish communication connection between the first transmitting unit 82 and NFC device, and judge if the NFC device stores the communication account information, and if not, it will send the communication account information to the NFC device.

The reading unit 83 is configured to read the communication account information stored in NFC device; the distance between the first terminal and NFC device is within the preset range.

The second transmitting unit 84 is configured to send the communication account information and identification information of the first terminal to the communication platform; thus, the communication platform can control the terminal to log in by the use of the communication account information according to the communication information and identification information;

The login unit 85 is configured to log in the communication platform by the use of the communication account information.

The login unit 85 can also be configured to log in the communication platform by the use of the communication account information in form of webpage version.

The login unit 85 is also configured to log in the platform by the use of the communication account information under the control of communication platform, after receiving the confirmation message sent by the second terminal; and the confirmation message is configured to allow the terminal to log in the communication platform by the use of the communication account information.

Optional, the terminal can be the first terminal described in the method embodiment, meaning that it can execute any step executed by the first terminal.

While various embodiments, features, and benefits of the present system have been described, it will be apparent to those of ordinary skill in the art that many more embodiments, features, and benefits are possible within the scope of the disclosure. For example, other alternate systems may include any combinations of structure and functions described above or shown in the figures.

The invention claimed is:

1. An access control method comprising:
receiving at a communication platform, communication account information and identification information of a first terminal;
transmitting the communication account information to the first terminal based on the identification information of the first terminal;
receiving from the first terminal identification information of the first terminal and the communication account information, wherein the communication account information is read from an NFC device;
sending, by the communication platform, a hint message to a second terminal;
receiving from the second terminal a response for the hint message; and
allowing the first terminal to log in to the communication platform by the use of the communication account information based on the communication account information and identification information, and based on the received response from the second terminal for the hint message.

2. The method of claim 1, wherein obtaining the identification information of the first terminal comprises a second terminal scanning the two-dimensional code displayed at the first terminal, to obtain the two-dimensional code information containing the identification information of the first terminal.

3. The method of claim 1, wherein the communication platform authenticates the communication account information, and compares the identification information with the response received from the second terminal, and in response to determining that the response is correct, the communication platform controls the first terminal to log in the communication platform by the use of the communication account information.

4. A system comprising a first terminal, a communication platform, a second terminal and an NFC device, the system comprising:
the second terminal configured to obtain the identification information of the first terminal, and sends the identification information and communication account information to the communication platform;

the communication platform configured to send the communication account information based on the identification information to the first terminal;

the first terminal configured to send the communication account information to the NFC device;

the NFC device configured to store the communication account information, when the distance between the first terminal and the NFC device is within the preset range;

the first terminal configured to read the communication account information stored in the NFC device and send its identification information and the above communication account information read from the NFC device to the communication platform; and the communication platform configured to send a hint message to the second terminal, and receive from the second terminal a response for the hint message and to control the first terminal to log in by the use of the communication account information based on the communication account information and identification information, and based on the received response from the second terminal for the hint message.

5. The system of claim 4, wherein the second terminal is configured to scan a two-dimensional code shown displayed at the first terminal, to obtain the two-dimensional code information containing the identification information of the first terminal.

6. The system of claim 4, wherein the communication platform is configured to send the hint message to the second terminal, wherein the second terminal is configured to show the hint message and send the response input by a user to the communication platform wherein the response is configured to allow the first terminal to log in the communication platform by the use of the communication account information.

7. The system of claim 4, wherein the communication platform is configured to authenticate the communication account information, and compare the identification information with that sent by the second terminal, and if the comparison passes, the first terminal is allowed to log in by the use of the communication account information.

8. An access control method implemented at a communication platform, the method comprising:

receiving from a first terminal identification information of the first terminal, wherein the identification information corresponds to the first terminal;

receiving from the first terminal communication account information, wherein the communication account information is retrieved from a near field device and is caused to be the stored on the near field device in response to receiving from a second terminal the first terminal identification information corresponding to the first terminal and the communication account information;

based on the first terminal identification information received from the second terminal, identifying the first terminal;

based on a comparison of the identification information and the communication account information controlling access to the communication platform via the first terminal;

transmitting to the second terminal a hint message; and allowing access to the communication platform via the first terminal in response to receiving a response to the hint message from the second terminal.

9. The method of claim 8 further comprises causing the first terminal to store the communication account information on the NFC device in response to receiving the communication account information from the first terminal.

* * * * *